April 14, 1970    G. E. CAILLETTE ET AL    3,506,221
ONE-MAN AIRCRAFT WITH JET-POWERED LIFT AND PROPULSION
Filed May 13, 1968    2 Sheets-Sheet 1

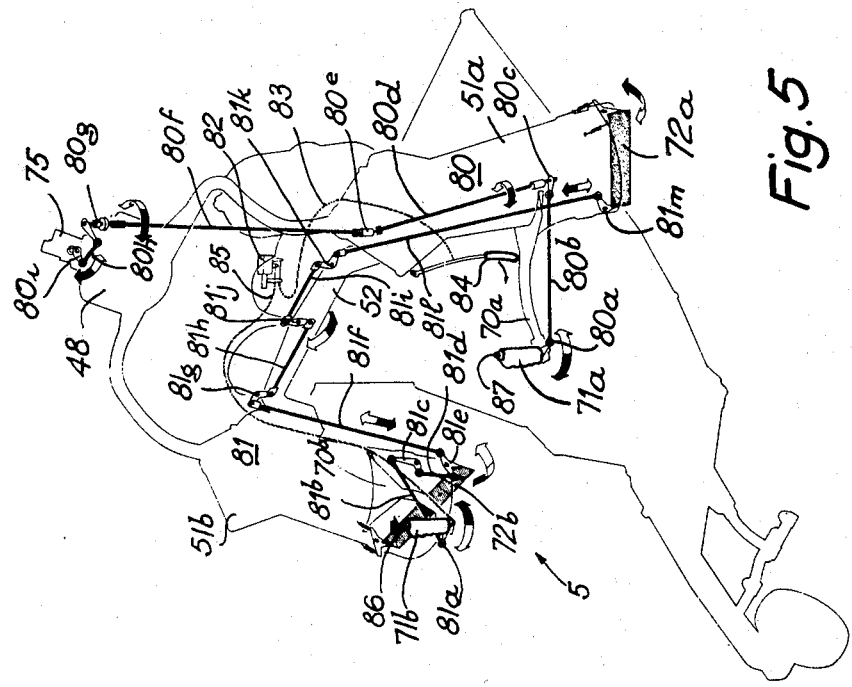
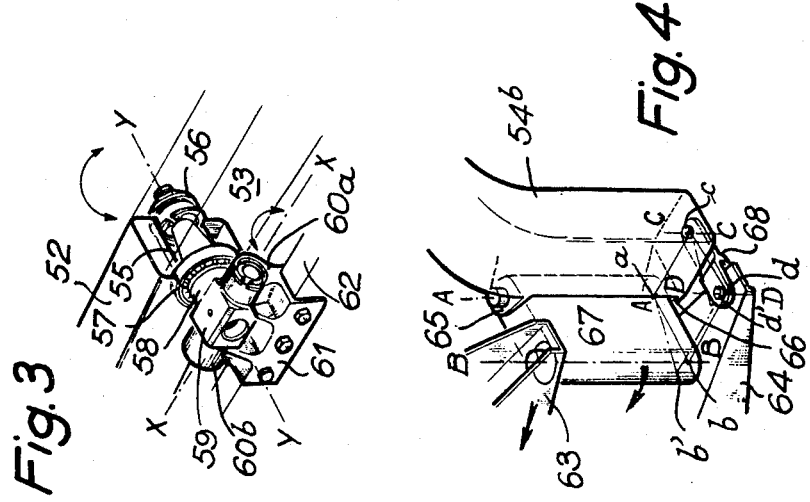

United States Patent Office 3,506,221
Patented Apr. 14, 1970

3,506,221
ONE-MAN AIRCRAFT WITH JET-POWERED LIFT AND PROPULSION
Georges Edmond Caillette, Tarbes, and Jean Amable Vidal, Paris, France, assignors to Sud-Aviation Societe Nationale de Constructions Aeronautiques, Paris, France
Filed May 13, 1968, Ser. No. 728,533
Claims priority, application France, May 23, 1967, 107,382
Int. Cl. B64c 29/04
U.S. Cl. 244—23                    7 Claims

ABSTRACT OF THE DISCLOSURE

A one-man aircraft with jet-powered lift and propulsion, comprises a structure consisting of a seat and a baggage-carrier, a landing gear comprising damper means in both the longitudinal and transverse directions, a jet-drive device rigid with a support articulated on said structure for motion at least in roll and pitch, means for orientating the aircraft and safeguard means for operation of said jet-drive device.

---

It is the object of the present invention to provide improvements in or relating to wingless jet aircraft which, through their ability to make vertical take-offs and landings, will notably carry one man over obstacles of various kinds, said improvements being relevant alike to the range and carrying ability and the safety of such aircraft.

A primary desirable improvement is to increase the endurance of this type of aircraft by using for lift and propulsion a jet drive which delivers the same thrust as conventional rockets but with lower fuel consumption. Another desirable feature is ease of handling coupled with easy and reliable control for the pilot.

It would finally be an advantage for such machines to be able to carry a bigger payload in order to broaden their mission capabilities and multiply their safety systems, and with such substantially increased loads it would notably be important to avoid accidents arising from the fact that the pilot takes off and lands on his legs.

This invention accordingly relates to a one-man jet aircraft which, in contrast to prior art machines, offers all the advantages mentioned hereinabove.

An aircraft according to this invention includes a structure comprising a seat and a baggage-carrier, a landing device comprising damping means in both the longitudinal and transverse directions, a jet-drive device which is fast with a support articulated to the structure for motion in roll and pitch at least, control means of the orientation of the aircraft and safeguard means relevant to operation of the jet-drive device.

The description which follows with reference to the accompanying non-limitative exemplary drawings will give a clear understanding of how the invention can be carried into practice.

In the drawings:

FIGURE 3 is a detail view of part of FIGURE 2, illustrating the manner of articulation of the jet-drive device on the aircraft structure.

FIGURE 4 is likewise a detail view from FIGURE 2, showing expansion absorbing means; and FIGURE 5 is a similar view to FIGURE 1, showing the aircraft control means and safeguards.

Figure 1:
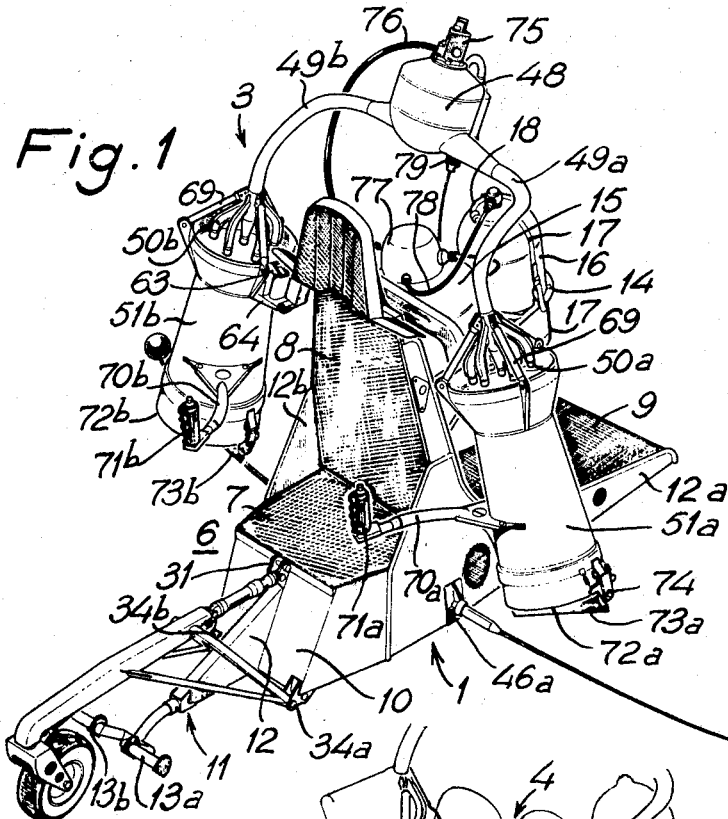
FIGURE 1 is a perspective view of an aircraft according to this invention.

The aircraft illustrated in the accompanying drawings consists of a structure 1 (FIGURE 1), a landing gear 2 (FIGURE 2) and a jet-drive device 3 (FIGURE 1) equipped with an expansion absorbing articulation system 4 (FIGURES 2, 3 and 4) and with control and safety means 5 (FIGURE 5).

As shown in FIGURE 1, the structure 1 comprises a box member 6 reinforced by internal bulkheads (not shown), the box member and the bulkheads being fabricated from riveted metal plate. The box member 6 has mounted thereon at the rear of its top surface 7 a vertical metal honeycomb backrest 8, in the lower part of its rear face a horizontal metal honeycomb baggage-carrier 9, and on its front face 10 a leg support 11. Lateral stiffening plates 12a and 12b unite box member 6, backrest 8 and baggage-carrier 9. The leg support 11 includes a vertical bracket 12 fixed to the middle of the end-face 10 of box member 6 and the front end of which supports two laterally projecting footrests 13a and 13b. The backrest supports on its rear face a metal rack 14 which receives, arranged one behind the other in the fore-aft direction, two reservoirs 15 and 16 respectively containing isopropyl nitrate under pressure and nitrogen compressed to 200 kg./cm.$^2$, said reservoir being made fast with the rack by means of straps 17 and securing rings 18.

Figure 2:
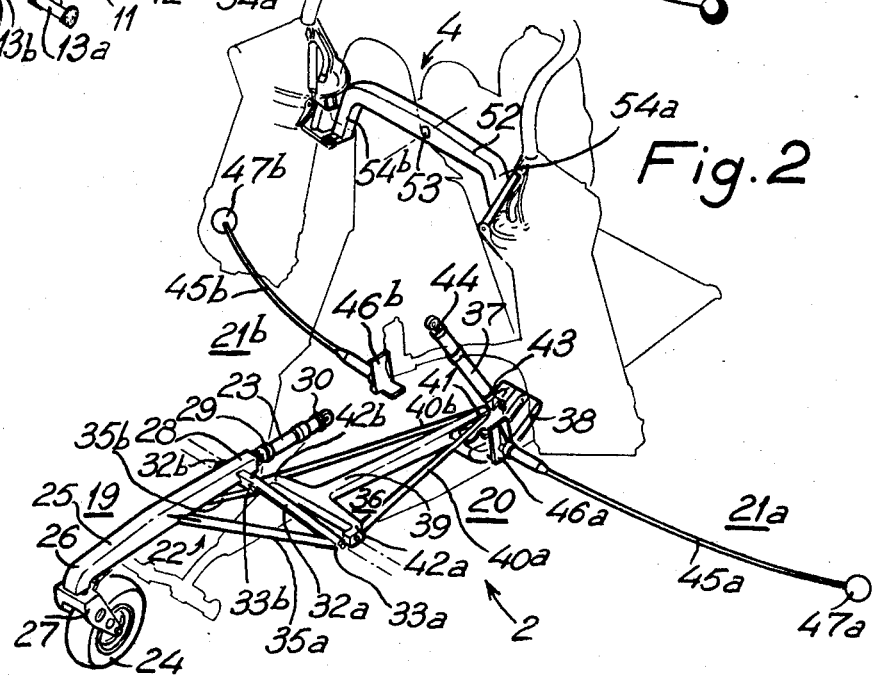
FIGURE 2 is a similar view to FIGURE 1, showing the landing gear and the manner of mounting the jet-drive device on the structure.

The monotrace landing gear 2 illustrated in FIGURE 2 includes a front gear 19, an undercarriage 20 and lateral balancing arms 21a and 21b.

The front gear comprises a structure 22, a damper 23 and a wheel 24.

The structure 22 consists of a longitudinal beam 25 the front end 26 of which carries the wheel 24 in a clevis 27. The rear end 28 of beam 25 is articulated upon one end 29 of the damper 23 (which forms an extension substantially of beam 25), the other end 30 of which is pivotally connected about a horizontal axis to a reinforcing attachment element 31 fixed to the middle of the upper part of end-face 10 of the box member 6. The end 28 of beam 25 further supports two cross-members 32a and 32b the ends 33a and 33b of which are pivotally connected about horizontal axes to reinforcing attachment elements 34a and 34b positioned respectively at the two bottom corners of the box member end-face 10. Triangulating bars 35a and 35b are disposed between the middle of beam 25 and the cross-member ends 33a and 33b respectively.

The undercarriage 20 comprises a structure 36, a damper 37 and a landing skid 38. The structure 36 consists of a T-member 39 associated with two triangulating bars 40a and 40b extending between its foot 41 and the ends 42a and 42b of its arms. The leg of T-member 39 is directed rearwardly and the ends 42a and 42b are pivotally connected about horizontal axes to the lower attachment elements 34a and 34b of box member 6. The foot 41 of T-member 39, which carries the skid 38, is pivotally connected about a horizontal axis to one end 43 of damper 37, the other end 44 of which is pivotally connected about a horizontal axis to an attachment element (not shown) positioned within box member 6. The structure 36 is substantially horizontal, the damper 37 is inclined downwardly and rearwardly, and the skid 38 is of substantially concave shape with its convexity facing the ground.

The lateral balancing arms 21a and 21b consist of flexible rods of compressed glass-fibre 45a and 45b removably mounted on reinforcing attachments 46a and 46b fixed to the lower part of the lateral plates 12a and 12b of the aircraft structure, substantially vertically below the backrest 8. These rods carry on their ends skids 47a and 47b and extend laterally from structure 1 with a rearward and downward sweep.

By way of a reaction motor, the jet-drive device 3 shown in FIGURE 1 includes a gas generator formed by a combustion chamber 48, two lateral pipes 49a and 49b, two sets of nozzles 50a and 50b and two ejectors 51a and 51b. These ejectors are each shaped substantially in the form of two substantially vertical coaxial cone frustums and are positioned respectively to the left and right of backrest 8 and fixed to the ends of a steel cross-member 52 which is part of the expansion absorbing articulation system 4. The axes of the two ejectors lie in the same plane and meet at a point located above the aircraft.

As shown in FIGURE 2, cross-member 52 extends above the top backrest 8, to which it is fixed by a hinge-pin 53 positioned above the center of gravity of the aircraft, and it is formed with two downwardly turned side portions 54a and 54b for supporting the ejectors.

Hinge-pin 53 is shown in greater detail in FIGURE 3 and consists of a system with two degrees of freedom, comprising a transverse pitch axis X—X and a longitudinal roll axis Y—Y. Cross-member 52 accordingly receives in its middle, within a longitudinal case 55, a housing 56 inside which is rotatable, in ball-bearings 57, the longitudinally extending horizontal leg 58 of a T-member 59 the horizontal transverse arms of which are pivotally mounted in bearings 60a and 60b formed in an attachment member 61 fixed to the upper part 62 of the backrest 8.

The expansion absorbing system shown in FIGURE 4 interconnects the portion 54b of cross-member 52 with two horizontal brackets 63 and 64 fixed one above the other on the side of the upper part of ejector 51b, a similar device being provided between the portion 54a and the ejector 51a. The portion 54b bears two horizontal lugs 65 and 66 positioned one above the other and between which is pivotally mounted, about a vertical axis A—A, a vertical and substantially longitudinal part 67 which is likewise pivotally mounted about another vertical axis B—B between the two brackets 63 and 64. The portion 54b further receives, beneath its lower part and pivotally about a vertical axis C—C, the head of a link 68 the foot of which is hinged about a vertical axis D—D at the projecting end of lower bracket 64. The base of the part 67 and the link 68 form, jointly with the base of portion 54b and the bracket 64, a parallel-motion linkage system having a fixed side ac and an opposite mobile side bd capable of assuming the position b'd' shown in FIGURE 4 and in so doing to absorb the expansions due to heat and pressure sustained by the pipes 49a and 49b, the brackets 63 and 64 moving outwardly and the part 67 turning in the same direction about the axis A—A.

In the jet-drive device shown in FIGURE 1, the gas generator is restrained above the reservoir 15 by the rigidity of the pipes 49a and 49b fixed on either side of the lower part of combustion chamber 48. Each of these pipes delivers the hot gas to the associated ejector 51a (or 51b) through the cluster of seven nozzles 50a (or 50b), the ejectors 51a and 51b being made fast with the distributor ends of pipes 49a and 49b through the medium of three articulated arms 69.

Fixed to the inboard flanks of ejectors 51a and 51b are two horizontal arms 70a and 70b, respectively, for swivelling the cross-member 52. These arms extend towards the fore-aft axis and the front of the aircraft and their ends carry vertical twistgrips 71a and 71b, respectively, which control the power setting and yawing motion respectively. Across the gas discharge outlets 72a and 72b of the ejectors are disposed yaw flaps 73a and 73b, respectively, which are pivotally mounted about transverse and substantially horizontal axes 74.

A nitrate isopropyl inflow adjusting valve 75 is fixed to the top of the gas generator combustion chamber 48 and is connected through a semi-flexible pipe 76 to a pressure relief valve (not shown) which is positioned inside the head 77 of isopropyl nitrate reservoir 15 and connected through a pipe 78 to the nitrogen reservoir 16. A cartridge 79 for igniting the isopropyl nitrate is fixed to the rear of the gas generator, which generator, together with the pipes 49a and 49b and the pipes 50a and 50b, is made of refractory metal.

The operation of the jet motor hereinbefore disclosed is as follows:

The motor uses isopropyl nitrate, a liquid propellant which is placed under pressure in its reservoir 15 by the compressed nitrogen issuing from the reservoir 18. This pressurized liquid flows through the pressure relief valve and into the safety circuit 82 (which will be described hereinafter with reference to FIGURE 5) and reaches the valve 75 which the pilot controls by means of twistgrip 71a so as to meter the flow rate, as will likewise be described hereinafter. The liquid is then ignited in combustion chamber 48 by cartridge 79, and the hot gases expand in the nozzles 50a and 50b, flow through the ejectors 51a and 51b where they are slowed down and cooled by the surrounding air entrained by said ejectors, and are finally discharged therefrom mixed with said air at a temperature between 100° C. and 150° C., the effect of the ejectors being to multiply the inherent thrust of the nozzles by a certain factor preferably in the region of 1.4.

The control system 5 shown in FIGURE 5 includes, in addition to twistgrips 71a and 71b, rigid transmission linkages 80 and 81 which respectively interconnect the power setting twistgrip 71a with the isopropyl nitrate inlet valve 75 and the yaw control twistgrip 71b with the yaw flaps 72a and 72b. Transmission linkage 80 comprises an articulation 80a; a link 80b co-extensive with arm 70a, an articulation 80c, a link 80d co-extensive with ejector 51a, an articulation 80e a link 80f between the ejector and generator 48, an articulation 80g, a link 80h between the generator and valve 75, and an ultimate articulation 80i. Transmission linkage 81 comprises an articulation 81a, a link 81b co-extensive with arm 70b, an articulation 81c, a link 81d co-extensive with ejector 51b, a lever 81e for deflecting flap 72b, a link 81f co-extensive with ejector 51b, an articulation 81g, two links 81h and 81i co-extensive with cross-member 52 and between which is interposed a beam-lever 81j for absorbing thermal expansions in said links, an articulation 81k, a link 81l co-extensive with ejector 51a and a lever 81m for deflecting flap 72a. Only the two links 80d and 80f operate by rotation, all the others operating by translation. These rigid transmission linkages are more faithful and more accurate and offer less frictional resistance than flexible transmission systems.

The safety system, likewise portrayed in FIGURE 5, includes, in respect of jet motor reliability, a switching device 82 equipped with a three-position crank and mounted in the head 77 of reservoir 15. The three possible settings of the crank are spaced 90° apart and correspond to three configurations, namely "Off," "Normal operation" and "Emergency operation." Said crank is actuated, on the one hand, by a flexible control 83 of known cable type and a lever 84 the handle of which is proximate arm 70a to permit switching from the "Off" position to the "Normal operation" position, and, on the other hand, by a flexible control 85 also of known cable type and a button 86 mounted on twistgrip 71b to permit switching from the "Normal operation" position to the "Emergency operation" position by any known means such as a latch released by actuation of button 86, thus liberating said crank which can pass from "Normal operation" to "Emergency operation" position under the action of a spring tensioned by passing from the "Off" position to the "Normal operation" position by the movement of lever 84. Twistgrip 71a bears a button 87 fitted with an automatic latch of any known construction which prevents the twistgrip from rotating back in the direction tending to reduce the power setting below a determinate value corresponding, say, to 80% of the lift required for the minimum weight of the aircraft, thereby after said twist grip has been rotated over said 80% power position, for takeoff purposes, for example, accidental extinction of the motor is averted. The actuation of button 87 is only required when termination of the combustion in chamber 48 is compulsorily desired.

Thus the pilot can use the lefthand twistgrip 71a, independently of the safety system, to control in normal flight conditions the power setting between two given lift-imparting values equal, say, to 80% of the minimum weight of the aircraft and 120% of its maximum weight. The pilot can use the righthand twistgrip 71b to control the yaw flaps 72a and 72b up to a certain maximum angle of deflection of, say, ±10°. The pilot can lastly use the arms 70a and 70b to control pitching motion of the aircraft by rocking the complete motor assembly about axis X—X and rolling motion by rocking it about axis Y—Y.

What we claim is:

1. In a one-man aircraft with jet powered lift and propulsion, in combination, a seat including a back, a baggage carrier and an attachment for laterally projecting footrests, a monotrace landing gear formed by a wheeled under-carriage articulated to said seat at the front thereof, a skid type under-carriage articulated beneath said seat, lateral balancing arms fixed to said seat and made of flexible material, jet motor means comprising fuel reservoirs, a combustion chamber, expansion nozzles and two ejectors positioned on either side of said seat, a cross member having ends supporting said ejectors, articulation means between said backrest and said cross member to permit relative pivotal movement therebetween about a roll axis and a pitch axis, control means coupled to said ejectors for varying the orientation of the aircraft and safeguard means coupled with said control means and jet motor means to restrict operation thereof in a particular range to insure reliability of said aircraft.

2. In an aircraft as claimed in claim 1, said control means comprising a yaw control twistgrip, a power setting control twistgrip, and a three-position operating mode selector, said safeguard means comprising a starting lever and an emergency operation button mounted on said yaw control twistgrip, flexible transmission means interconnecting said lever and said button to said three-position operating mode selector, and a second button mounted on said power setting control twistgrip whereby to fix the lower limit of said power setting.

3. In an aircraft as claimed in claim 1, said articulation means including a common unit providing the pivotal movement about said roll axis and pitch axis.

4. In an aircraft as claimed in claim 1, means for fixing the ejectors to said cross-member comprising elements constituting parallel-motion linkages of which two opposite sides are fixed respectively to the associated ejector and to said cross-member.

5. In an aircraft as claimed in claim 4, said ejectors having axes lying in the same plane and intersecting at a point located above the aircraft.

6. In an aircraft as claimed in claim 1, and control means comprising two twistgrips which are mounted on arms connected to said ejectors and which are connected through rigid transmission linkages to a valve for adjusting the flow rate into said combustion chamber and to yaw flaps positioned across the ejector outlets.

7. In an aircraft as claimed in claim 1, said articulation means being located above the center of gravity of the aircraft.

References Cited

UNITED STATES PATENTS

| | | | |
|---|---|---|---|
| 3,042,345 | 7/1962 | Holland | 244—100 |
| 3,381,917 | 5/1968 | Moore et al. | 244—4 |

MILTON BUCHLER, Primary Examiner

J. E. PITTENGER, Assistant Examiner

U.S. Cl. X.R.

180—1